TELEVISION DEGAUSSING APPARATUS

Filed Dec. 19, 1963 2 Sheets-Sheet 1

INVENTORS,
ROBERT L. BARBIN &
JERROLD K. KRATZ
BY W. H. Spreadle
ATTORNEY

INVENTORS
ROBERT L. BARBIN &
JERROLD K. KRATZ
BY W. H. Sprague
ATTORNEY

United States Patent Office 3,317,781

Patented May 2, 1967

3,317,781

TELEVISION DEGAUSSING APPARATUS

Robert L. Barbin and Jerrold K. Kratz, Indianapolis, Ind., assignors to Radio Corporation of America, a corporation of Delaware Filed Dec. 19, 1963, Ser. No. 331,668
4 Claims. (Cl. 315—8)

This invention relates to apparatus for degaussing television receivers and particularly to the electromagnetic structures usable in systems for automatically degaussing a cathode ray color picture tube.

The metallic mask and its supporting structure together with other metal parts used in conjunction with a shadow mask type of color television picture tube are subject to becoming magnetized both in shipment to, and continued use in, a consumer's home. Such magnetization is effected by bringing the picture tube into proximity with magnetizing structures such as trucks, elevators and the like and also by exposure during use to influences such as the earth's magnetic field. The resultant magnetic field from such random or other magnetization often adversely affects the performance of the color television receiver in which the picture tube is embodied. In the past the remedy for such magnetization has included a manual degaussing of the receiver, an operation usually performed by a serviceman. It also has been the experience of users of such a color television apparatus (receiver) that the relocation or reorientation of the apparatus frequently required another degaussing in order to effect optimum performance in the new position.

It has been proposed previously to effect automatic degaussing of a color television picture tube by using the field neutralizing coil with which some prior art receivers were provided. Such a coil is wound around the picture tube in close proximity to the shadow mask and its supporting structure. When used for field neutralization purposes such a coil was energized with sufficient direct current to produce a magnetic field having a direction substantially parallel to the longitudinal axis of the tube. The magnitude and direction of the neutralization field was adjusted to be substantially equal and opposite to that component of the earth's magnetic field also extending substantially parallel to the longitudinal tube axis.

In order to effect automatic degaussing of the picture tube screen structure it was proposed to energize the field neutralization coil with alternating current which initially had a substantial magnitude but which was gradually decreased to zero. While such a device and technique has been effective for practical purposes for the accomplishment of degaussing with smaller picture tubes it has been found that, with the size of color picture tubes presently in current use, the apparatus is often not satisfactory for the reason that it is difficult to produce a degaussing field of sufficient strength throughout the entire area which it is desired to demagnetize.

It is, therefore, an object of the present invention to provide a relatively simple, inexpensive, efficiently operating, and effective electro-magnetic structure for energization to automatically degauss a color picture tube and associated magnetic elements.

The present invention includes a member of magnetic material forming a closed path around at least part of the conical portion of the cathode ray picture tube. In one illustrative embodiment the invention makes use of an annular member such as the color purity shield and the mounting structure for the picture tube already provided in many color television receivers. A plurality of small coils are mounted on the color purity shield at spaced points thereabout and connected into a circuit which is energized by alternating current each time that the receiver is turned on for operation. The energizing circuit is such that the alternating current energizing the electromagnet coils initially has a large magnitude which decreases automatically until it is substantially zero for the remainder of the time that the receiver is being operated.

This invention is more fully described in the following specification taken in conjunction with the accompanying drawing in which.

Figure 1:
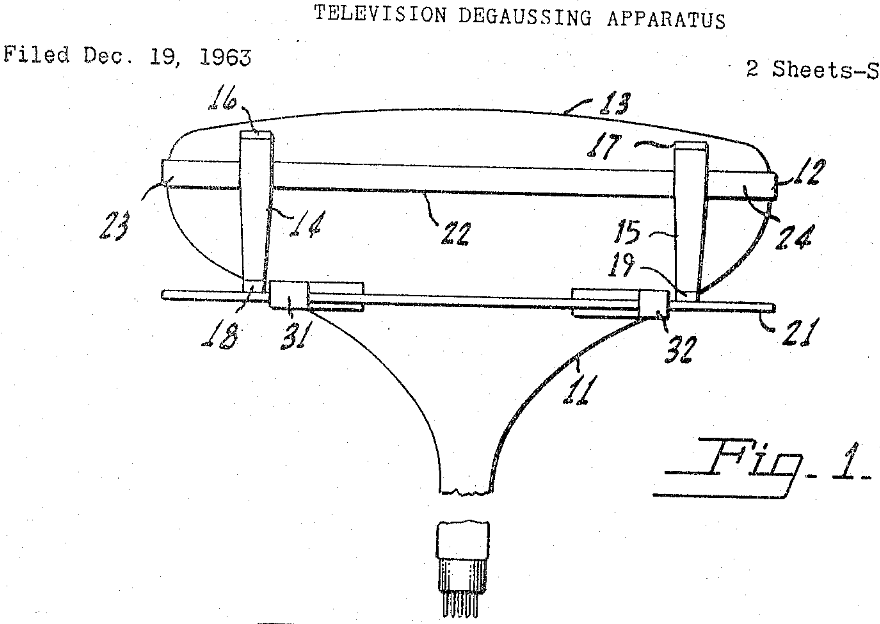
FIGURE 1 is a top view of a shadow mask type color picture tube showing the structure for mounting the tube in a cabinet and also showing the color purity shield.

Reference first will be made to FIGURE 1. The color picture tube 11, which is of the shadow mask type such as a 21FJP22 tube described in a bulletin published in January 1961 by Radio Corporation of America, Harrison, New Jersey, is encircled by a mounting strap 12 adjacent to the face plate 13. The mounting strap 12 is securely fastened to the picture tube and is provided with four mounting brackets such as 14 and 15 and two similar ones at the bottom of the tube. The mounting brackets which are riveted, or otherwise securely attached, to the strap 12 are provided with lugs at both ends for mounting purposes. The forwardly extending lugs 16 and 17 respectively of the brackets 14 and 15, together with corresponding lugs on the lower two brackets, are used to attach the tube and its supporting structure to the front wall of the cabinet in which the apparatus is installed. The brackets 14 and 15 also are provided respectively with rearwardly extending lugs 18 and 19 and, together with corresponding lugs on the lower two brackets, serve to mount a color purity shield 21. The mounting structure including the purity shield 21 described up to this point is used in color television receivers manufactured by Radio Corporation of America identified as Chassis CTC–12 covered by Color Television Service Data-File: 1962 No. T6—distributed by RCA Sales Corporation, 600 N. Sherman Drive, Indianapolis 1, Ind.

The color purity shield 21 may be a single layer of magnetic material as indicated in FIGURE 1 or preferably it may consist of a laminated structure of several thinner sheets of metal for the purpose of minimizing eddy current losses and improving shielding effectiveness. The mounting strap 12 is made so that the top portion 22 and a corresponding bottom portion may be of non-magnetic material to avoid magnetic "short circuiting" of the flux from flux generating coils which will be described subsequently. The side portions 23 and 24 of the mounting strap, the brackets 14 and 15, their corresponding brackets on the under side of the tube and the purity shield 21 are also of magnetic materials.

Figure 2:
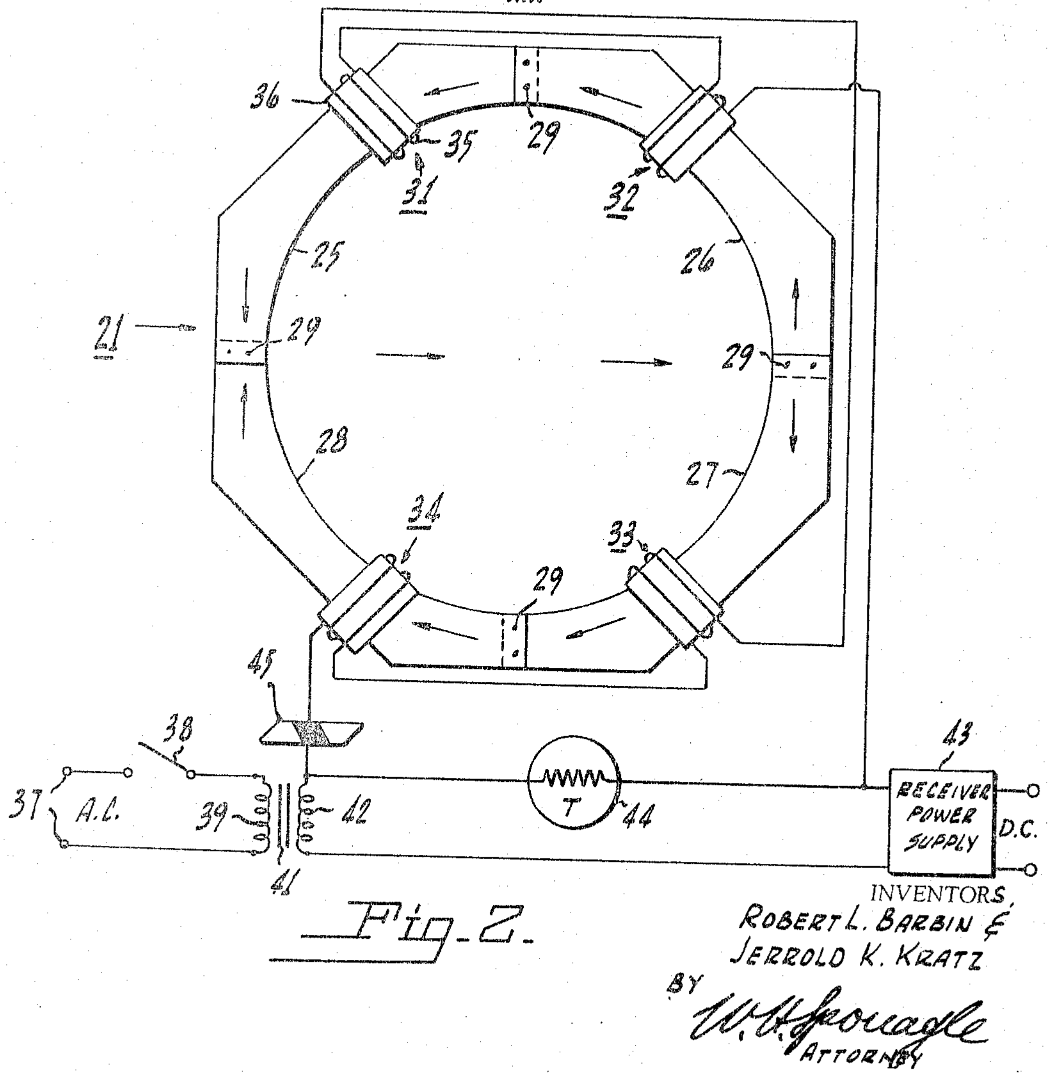
FIGURE 2 is the rear view of the color purity shield showing the coils mounted thereon together with an energizing circuit for effecting the automatic degaussing of the picture tube.

Additional reference now is made to FIGURE 2. The color purity shield 21, in one practical version, consists of four similar sections 25, 26, 27 and 28. These sections are joined together by overlapping their respective ends substantially as shown and securing them by means of rivets 29 or equivalent devices. The general configuration of the purity shield 21 resembles that used in the CTC–12 color television receivers previously referred to. In the present instance, however, the configuration has been modified slightly to adapt the shield for the additional function of providing a relatively low reluctance magnetic circuit for degaussing purposes.

A plurality of flux generating coils are mounted on the purity shield 21 at spaced points thereabout in order to effect the desired degaussing of the color picture tube structure and associated magnetic elements. As illustratively disclosed herein, four such flux generating coils 31, 32, 33 and 34 are shown. These coils are identical so that only one of them will be described. The coil 31, for example, is formed by winding a plurality of turns 35 (e.g. 200 turns) of copper magnet wire around a relatively flat supporting tube or bobbin 36. The internal dimensions of this coil tube 36 are such as to enable the coil to be mounted on the shield section 25 by slipping it over one end of the section before it is joined to its adjacent sections 26 and 28.

The flux generating coils 31, 32, 33 and 34 for the degaussing electromagnetic apparatus are connected in series to an alternating current source such that the upper coils 31 and 32 aid one another in producing flux flowing at a given instant counterclockwise (as viewed in FIGURE 2) in the upper half of the purity shield and the coils 33 and 34 aid one another in the production of flux flowing at the same instant clockwise in the lower half of the purity shield as indicated by the arrows. As a result, at that instant a field is produced within the picture tube in which the flux direction is from left to right as indicated by the arrows. It will be understood that at a succeeding instant when the direction of the alternating current flow through the flux generating coils is in the opposite direction, the described flux patterns will have the opposite polarity.

The flux generating coils 31, 32, 33 and 34 are energized by alternating current derived from terminals 37 upon the closure of a switch 38. Such switch closure energizes the primary winding 39 of a transformer 41 so as to produce alternating current in the secondary winding 42 of the transformer. The secondary winding is connected to the power supply 43 for the television receiver by means of a circuit including a thermistor 44. The thermistor is a device which, when cool, has a relatively high resistance but, when hot, has a relatively low resistance. The coils 31, 32, 33 and 34 are energized by the voltage drop across the thermistor in a circuit which includes a voltage dependent resistor 45. The voltage dependent resistor is a device which has a relatively low resistance when a high voltage is impressed across it and a relatively high resistance when the impressed voltage is low. It will be observed that the resistive properties of the thermistor 44 and the voltage dependent resistor 45 are of a reciprocal nature.

The energization of the degaussing apparatus is as follows, assuming that the thermistor 44 is cold, i.e. at room temperature. Immediately upon closure of the switch 38, which conveniently is the on-off switch of the television receiver, the current flow through the thermistor 44 to the power supply 43 produces a relatively large voltage drop across the thermistor. At this time the resistance of the voltage dependent resistor is low so that alternating current flows through the flux generating coils 31, 32, 33 and 34 of the degaussing apparatus at considerable amplitude. As a consequence, a relatively strong alternating magnetic field is produced within the picture tube 11 by the degaussing apparatus including the coils 31, 32, 33 and 34 and the purity shield 21. As the thermistor 44 warms in response to current flow therethrough its resistance decreases, thereby decreasing the voltage drop thereacross and the amplitude of the alternating current applied to the flux generating coils. As a result of the decreased voltage the resistance of the voltage dependent resistor 45 increases, thereby decreasing the current flow through the flux generating coils. As a consequence, the strength of the alternating magnetic field produced by the degaussing apparatus decreases at a rate determined by the characteristics of the thermistor 44, the voltage dependent resistor 45, the alternating current voltage and the receiver load. The resistance of the thermistor 44 ultimately heats sufficiently that its resistance and the voltage drop thereacross are very small. The resultant voltage applied to the voltage dependent resistor 45 is so small that the current through it and the flux generating coils is of negligible value. Full alternating current voltage is applied to the receiver power supply 43 enabling it to supply the direct current for the operation of the television receiver. The coils 31, 32, 33 and 34, being effectively deenergized, produce no further significant magnetic field within the picture tube. At this point the metallic structures of the color picture tube 11 and associated magnetic elements are effectively demagnetized. The color purity shield 21, thereafter, functions only to provide a shielding effect from the earth's and other undesired magnetic fields.

Figure 3C:
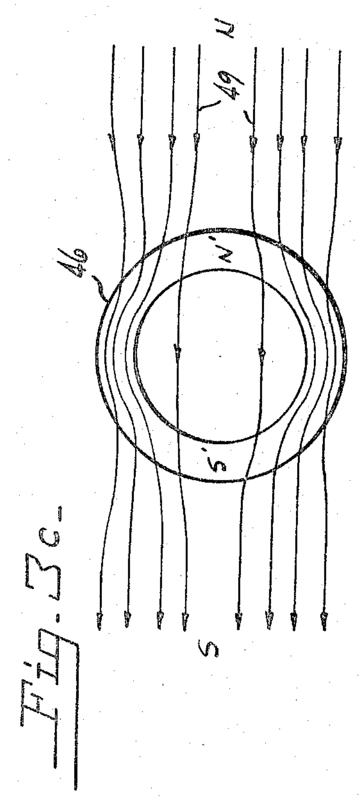
FIGURES 3*a*, *b*, *c* and *d* are explanatory diagrams of the operation of the apparatus embodying this invention.
Figure 3D:
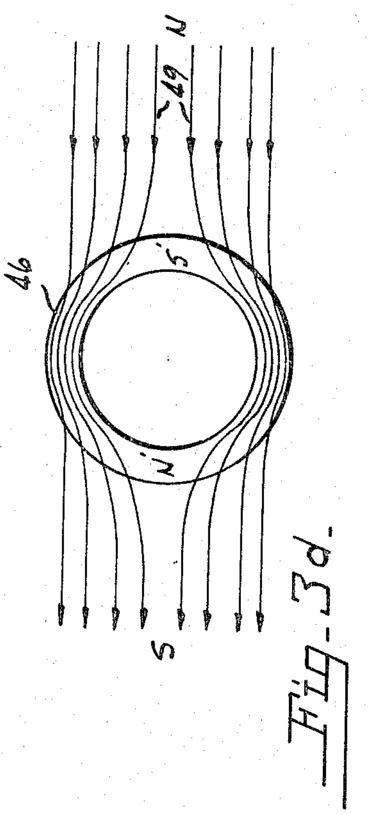
Figure 3A:
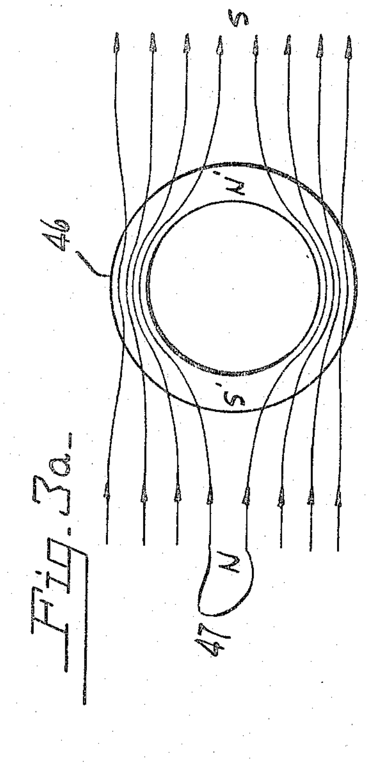

In order to better understand the manner in which the present arrangement functions to produce the beneficial results of rendering the electron beams of the color picture tube relatively immune from effects of the earth's and other undesired magnetic fields, reference is now made to FIGURES 3*a*, *b*, *c* and *d*. In FIGURE 3*a* there is represented a ring 46 of high permeability magnetic material. This ring is comparable to the color purity shield previously referred to. If such a ring is thoroughly degaussed while in a uniform magnetic field such as represented by the lines of force 47 polarized as indicated by the symbols N and S, the ring is magnetized by this field in the polarity indicated by the symbols N′ and S′. The magnetic flux of this external field then flows freely through the ring 46 as indicated, leaving a comparatively field-free region inside of the ring. The electron beams of a color picture tube are located in this field-free region and they are not influenced by the external field.

Figure 3B:
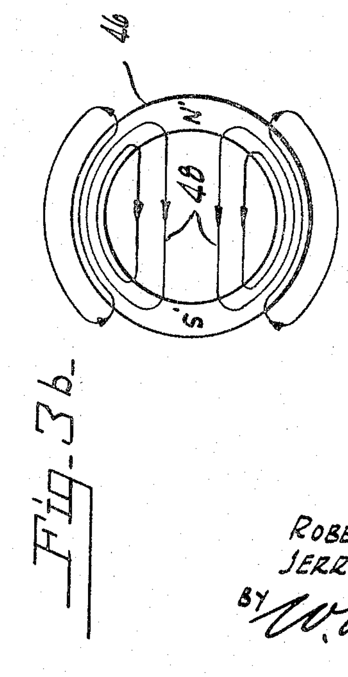

If now the external field represented in FIGURE 3*a* were to be removed, the magnetic situation would be as illustrated in FIGURE 3*b*. By virtue of its having been degaussed while exposed to the external field shown in FIGURE 3*a* the ring 46 is magnetized, as indicated by the symbols N′ and S′ in FIGURES 3*a* and 3*b*. In such a situation in the absence of an external field, a residual field indicated by the lines 48 would be produced within the ring and have a polarity as indicated by the arrows.

Now assume that the ring 46 with the described residual magnetism is placed in an external field such as represented by the lines 49 of FIGURE 3*c* having a polarity as indicated by the arrows opposite to the polarity of the field represented by the lines 47 of FIGURE 3*a*. Now, the residual magnetism of the ring 46 is oriented in a direction to aid or reinforce the externally applied field in the space surrounded by the ring 46, but opposes the externally applied field within the magnetic material of the ring, so that the ring provides a less effective shunt for the externally applied field around the space surrounded by the ring 46. As a result an undesired portion of the externally applied field exists in the space inside of the ring and affects the electron beams.

FIGURE 3*d* illustrates the shunting effect produced by the ring 46 of FIGURE 3*c* after it has been degaussed again while immersed in the same externally applied field as illustrated in FIGURE 3*c*. Even though the externally applied field is of a polarity opposite to that shown in FIGURE 3*a*, it is effectively shunted by the ring around the space within the ring in which the electron beams of the picture tube are located.

To illustrate more concretely the described functioning of this apparatus, the situation illustrated in FIGURE 3*a* is that encountered when the television picture tube is facing in an eastward direction, for example. The externally applied filed represented by the lines 47 then is the horizontal component of the earth's magnetic field which is substantially at right angles to the longitudinal axis of the picture tube. The situation represented in FIGURE 3*c* is that encountered when the television receiver having been degaussed while facing east is placed so that the picture tube faces in a westward direction. Again, the externally applied field represented by the lines 49 is the same horizontal component of the earth's magnetic field which, by virtue of the reorientation of the television set, again is at right angles to the longitudinal axis of the picture tube but is in the opposite direction with respect to the tube.

For reasons apparent from the foregoing discussion, it is desirable that facilities for automatically degaussing a television receiver be provided so that the beams will be shielded from the influence of the earth's magnetic field and any other field-producing objects regardless of its orientation.

The shield 21 and the flux generating coils 31, 32, 33 and 34 during the initial stages of operation of the television receiver provide an alternating field-producing electromagnet which is made effective within the desired portion of the color picture tube 11 not only by means of the purity shield itself but also by means of the mounting brackets 14 and 15 and their corresponding lower brackets together with the side portions 23 and 24 of the mounting strap 12 acting as pole pieces. By means of the described electromagnetic structure acting as such pole pieces the shadow mask and the supporting structure for it and other metallic components in the screen region of the color picture tube 11, the color purity shield 21, the picture tube mounting strap 12, and associated structures such as brackets 14 and 15 are automatically degaussed each time that the receive is turned on and kept in operation for at least a short time such as a minute.

The illustrative embodiment of the invention discloses the use of four flux producing coils mounted on the purity shield 21 and connected in the manner described. Other arrangements come within the purview of the invention. For example, other numbers of coils may be employed so long as they are properly wound and connected for energization to produce the type of flux pattern shown in FIGURE 2. In this example the two pole structure providing a horizontally directed flux in the area of the picture tube was chosen to provide a maximum degaussing effect for changes in the horizontal component of any external field. Other orientations or additional poles may be utilized for other applications. Also, although the connection illustrated is preferred for example for reasons of simplicity, a connection of the degaussing coils may be employed to a source of alternating current which is separate from the one shown and which may include the transformer for the low voltage power supply of the receiver. For example, the coils such as 31, 32, 33 and 34 may be directly connected to a source of alternating current or they may be connected through a separate transformer. Furthermore, a cylindrical annular member of magnetic material (of which the illustrated shield 21 may be considered a transverse section) may be mounted so as to surround at least part of the conical section of the picture tube and serve as a low reluctance circumferential path for magnetic flux produced by coils suitably wound thereon.

The degaussing apparatus embodying the present invention is one which requires no special adjustment by the operator of the receiver nor any special activation other than the operation of turning the receiver on and off. Also, the apparatus is such that it operates every time that the set is turned on and left in such condition for a relatively short period of time such as that ordinarily required for the electron tubes of the receiver to warm up. The degaussing apparatus is effective irrespective of the position of the receiver and its orientation relative to the earth's magnetic field and other stray magnetic influences. This enables the positioning of the receiver in substantially any location in the user's home and also permits color television receivers to be designed for swivel operation much in the same manner as many black and white receivers are presently designed. The nature of the apparatus is such that essentially no losses are introduced in the system after the initial warm up period and relatively little heat is generated in its operation.

What is claimed is:

1. Degaussing apparatus for a television picture tube adapted to be energized periodically by alternating current of a magnitude which initially is sufficiently large to demagnetize the tube structure and which diminishes effectively to zero in a short time commensurate with the warm-up of a receiver embodying said picture tube, comprising in combination:

a generally planar annular member of magnetic material mounted rearwardly of the screen of said picture tube, perpendicular to the axis of said tube and surrounding the conical portion of said tube;

a plurality of pairs of coils wound about said annular member at points spaced about the periphery of said member, said coils respectively enveloping different radial cross sections of said annular member; and means connecting the coils of each pair to said source of alternating current in a manner to aid one another in the production of magnetic flux in those portions of said annular member adjacent to said coils.

2. Degaussing apparatus for a television picture tube adapted to be energized periodically by alternating current of a magnitude which initially is appreciable and which diminishes effectively to zero comprising in combination:

a generally planar annular member of magnetic material mounted rearwardly of the screen of said picture tube, perpendicular to the axis of said tube and surrounding the conical portion of said tube;

a plurality of pairs of coils wound about said annular member at points spaced about the periphery of said member, said coils respectively enveloping different radial cross sections of said annular member; and means connecting the coils of each pair to said source of alternating current in series aiding one another in the production of magnetic flux in those portions of said annular member adjacent to said coils.

3. Degaussing apparatus for a television picture tube adapted to be energized periodically by alternating current of a magnitude which initially is appreciable and which diminishes effectively to zero comprising in combination:

a generally planar annular member of magnetic material mounted rearwardly of the screen of said picture tube, perpendicular to the axis of said tube and surrounding the conical portion of said tube;

a plurality of coils wound about said annular member at points spaced about the periphery of said member, said coils respectively enveloping different radial cross sections of said annular member;

means connecting a first group of adjacent coils to said source of alternating current in series aiding one another in the production of magnetic flux in those portions of said annular member in the vicinity of said first group of coils; and means connecting a second group of adjacent coils to said source of alternating current in series aiding one another in the production of magnetic flux in those portions of said annular member in the vicinity of said second group of coils, said coil connections being such that the produced magnetic flux is opposing in those portions of said annular member between said first and second coil groups.

4. Degaussing apparatus for a television picture tube adapted to be energized periodically by alternating current of a magnitude which initially is appreciable and which diminishes effectively to zero comprising in combination:

a mounting strap securely clamped around said picture tube in the vicinity of the screen of said tube, said strap having non-magnetic top and bottom sections and magnetic side sections;

a mounting bracket of magnetic material attached to said strap at each of the junctions of a magnetic and a non-magnetic section, each bracket having a forwardly extending lug for attachment to a housing enclosure and a rearwardly extending lug;

a generally planar annular member of magnetic material attached to said rearwardly extending lugs and surrounding the conical portion of said tube in a plane perpendicular to the axis of said tube;

a coil wound about said annular member adjacent to each of said mounting brackets; and connections between said coils and said source of alternating current to produce magnetic flux in said annular member, said mounting brackets and the magnetic side sections of said mounting strap serving as pole pieces to create an alternating magnetic field within said tube in the vicinity of said screen.

References Cited by the Examiner

UNITED STATES PATENTS

| | | | |
|---|---|---|---|
| 2,921,226 | 1/1960 | Vasilevskis | 315—8 |
| 2,962,622 | 11/1960 | Popovich | 317—157.5 X |
| 3,106,658 | 10/1963 | Chandler et al. | 315—8 X |
| 3,240,985 | 3/1966 | Ammerman et al. | 315—8 |
| 3,249,795 | 5/1966 | Dietch | 315—8 |

MILTON O. HIRSHFIELD, *Primary Examiner.*

S. BERNSTEIN, *Examiner.*

D. J. YUSKO, J. A. SILVERMAN, *Assistant Examiners.*